United States Patent [19]
Nardone et al.

[11] Patent Number: 6,094,209
[45] Date of Patent: *Jul. 25, 2000

[54] CARD PRINTING AND LAMINATING APPARATUS

[75] Inventors: Edward A. Nardone, Wakefield; Paul R. Caron, Tiverton; Christian S. Rothwell, North Kingstown; Harold D. Schofield, Narragansett; Gary Field, Portsmouth, all of R.I.

[73] Assignee: Atlantek, Inc., Wakefield, R.I.

[*] Notice: This patent is subject to a terminal disclaimer.

[21] Appl. No.: 08/939,865

[22] Filed: Sep. 29, 1997

Related U.S. Application Data

[63] Continuation of application No. 08/403,072, Mar. 13, 1995, Pat. No. 5,673,076.

[51] Int. Cl.[7] .................................................. B41J 2/325
[52] U.S. Cl. ........................ 347/171; 347/218; 156/230; 156/277
[58] Field of Search .................................... 347/171, 172, 347/174, 176, 215, 218; 400/120.16, 120.17, 525, 120.01, 120.02, 120.04; 156/230, 277

[56] References Cited

U.S. PATENT DOCUMENTS 5,667,316  9/1997  Nardone et al. ................... 400/120.16
5,673,076  9/1997  Nardone et al. ........................ 347/171

*Primary Examiner*—Huan Tran
*Attorney, Agent, or Firm*—Barlow, Josephs & Holmes, Ltd.

[57] ABSTRACT

An apparatus for printing and laminating plastic cards consists of a thermal transfer printing station including ribbon and a thermal printhead for printing an image on a receptor surface of a receptor card, a laminating station including laminating film and a heated laminating roller mounted for engagement with said receptor surface of said receptor card during a laminating operation, and a guided carriage for transporting the receptor card beneath the printhead and the heated laminating roller. The carriage includes a resilient surface for receiving the receptor card with a receptor surface facing upwardly. The carriage is guided on a pair of rails to insure proper registration and tracking of the receptor card. The carriage is driven by a threaded rod which passes through a threaded bore in the carriage wherein rotation of the threaded rod by a motor causes movement of the carriage along the guide rails. The apparatus further includes a hopper for storing a plurality of cards for printing, a cleaning station for cleaning the receptor surface of the card prior to printing, and a pair of output nip rollers including a heated lower roller for engaging and heating a lower surface of the receptor card. The carriage enable the card to be transported by a single carrier from the hopper to the output nip rollers.

17 Claims, 13 Drawing Sheets

CARD PRINTING AND LAMINATING APPARATUS

CROSS-REFERENCE TO RELATED APPLICATIONS

This application is a continuation of application Ser. No. 08/403,072, filed on Mar. 13, 1995, now issued as U.S. Pat. No. 5,673,076.

BACKGROUND AND SUMMARY OF THE INVENTION

The instant invention relates to apparatus for printing and laminating identification cards, and more particularly to a thermal printing apparatus and means for transporting a card through printing and laminating stations.

Card printing apparatus have heretofore been known in the art. In this regard, the prior card printing apparatus have primarily utilized successive nip rollers to transport a receptor card through a printing apparatus for printing. While the prior art devices have served their intended purpose for the most part, the devices have several shortcomings related to the transport systems for moving the card through the printing apparatus.

The instant invention provides a threaded rod driven carriage for transporting the receptor card through successive stations of the apparatus. More specifically, the apparatus includes a hopper for storing a plurality of receptor cards to be printed, a cleaning station for cleaning the receptor surface of the receptor card, a printing station for printing an image onto the receptor surface of the receptor card, a laminating station for applying a laminating film over the printed image on the receptor surface of the card, and an output station for outputting the completed card. The carriage includes a resilient card receiving surface for receiving the receptor card with the receptor surface facing upwardly. The carriage is guided through the successive stations of the apparatus on a pair of guide rails. The carriage is driven by a threaded rod which passes through an inwardly threaded cylinder in the carriage body. A reversible motor is operative for rotating the threaded drive rod for movement of the carriage along the guide rails. The hopper comprises a vertical chute which maintains a plurality of receptor cards in stacked relation. The carriage passes underneath the hopper wherein a single receptor card is removed from the hopper and received onto the receiving surface thereof. The carriage then moves to the cleaning station wherein the receptor card is passed beneath a silicone roller mounted for rolling engagement with the receptor surface of the receptor card. The card is then transported beneath a thermal printhead wherein a thermal transfer ribbon passes intermediate the printhead and the receptor surface of the receptor card. The transfer film includes a plurality of colored panels reoccurring in a repetitive pattern. In order to achieve a full color image on the receptor card, the card must be passed underneath the printhead three separate times for successive printing of each of the colored ribbon panels, i.e. cyan, magenta, and yellow. In this regard, the printhead is movable between a printing position wherein the printhead is positioned for engagement with the receptor surface of the receptor card and an idle position wherein the printhead is lifted out of engagement with the receptor card. The apparatus includes a spring assembly for normally biasing the printhead to the printing position, a cam system for lifting and lowering the printhead into and out of engagement with the receptor card and a solenoid for selectively maintaining the printhead in the idle position. Successive printing occurs by lowering the printhead into the printing position during forward movement of the carriage along the guide rails and then lifting the printhead to the idle position during backward movement of the carriage along the guide rails. The carriage then transports the receptor card beneath a laminating station including a laminating film supply and a heated laminating roller mounted for engagement with the receptor surface of the receptor card. The laminating film passes intermediate the heated laminating roller and the receptor card during the laminating operation for overlaying a holographic image onto the printed surface of the card. The laminating roller is also mounted for movement between a laminating position and an idle position. Movement of the laminating roller is accomplished via the same type of cam and solenoid apparatus as used for the printhead. The laminating roller and printhead must be maintained in the idle position for return of the carriage to the hopper for picking another card. The carriage then transports the receptor card to a pair of output nip rollers via a guide channel. The heat applied to the upper surface of the card stresses the plastic and causes it to curve upwardly. The guide channels maintain the card in a relative flat configuration while passing to the output rollers. In this regard, the lower nip roller is heated to apply heat to the lower surface of the receptor card. Heating of the lower surface of the card balances the stresses on the plastic so that the card exits the printer in a substantially flat configuration.

Accordingly, among the objects of the instant invention are: the provision of a card printing apparatus including a threaded rod driven carriage for transporting a receptor card through the printing station; the provision of a card printing apparatus including a printing station and a laminating station; the provision of apparatus of lifting and lowering the printing and laminating devices as the carriage transport system moves therebeneath; and the provision of a card printing apparatus including a hopper for holding cards to be printed, a cleaning apparatus for cleaning a receptor surface of the card prior to printing, a printing station for printing an image on the receptor surface of the card, a laminating station for laminating a holographic film over the printed surface of the card, and a output station for outputting the card.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
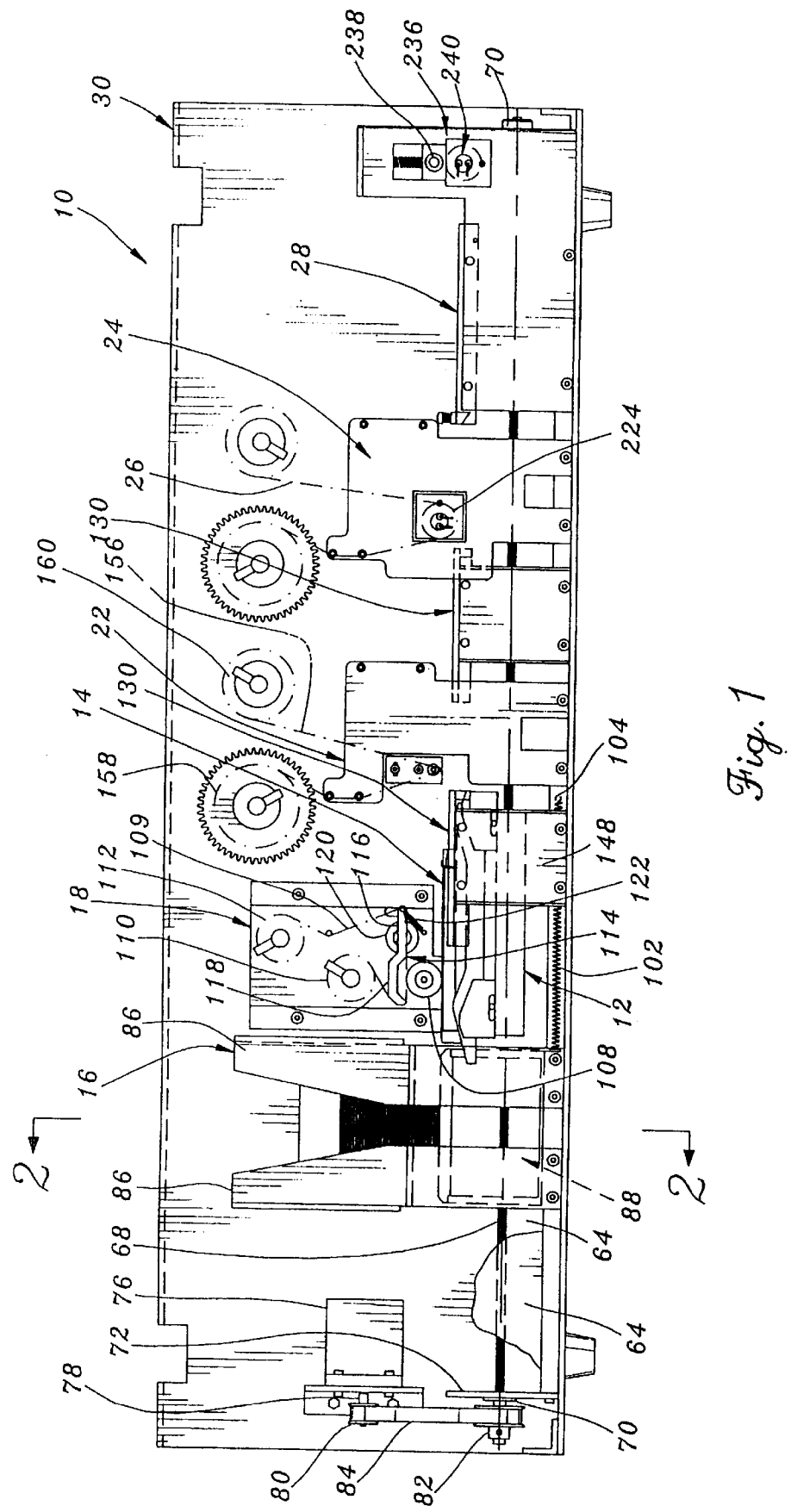
FIG. 1 is a side elevational view of the apparatus of the instant invention.

Referring now to the drawings, the card printing apparatus of the instant invention is illustrated and generally indicated at 10 in FIGS. 1. As will hereinafter be more fully described, the instant invention provides a threaded rod driven carriage assembly generally indicated at 12 for transporting a receptor card 14 through successive cleaning, printing and laminating stations of the apparatus 10. The receptor card 14 preferably comprises a rigid plastic, such as polyvinylchloride (PVC).

More specifically, the apparatus 10 includes a hopper assembly generally indicated at 16 for storing a plurality of receptor cards 14 to be printed, a cleaning assembly generally indicated at 18 for cleaning a receptor surface 20 of the receptor card 14, a printhead assembly generally indicated at 22 for printing an image onto the receptor surface 20 of the receptor card 14, a laminating roller assembly generally indicated at 24 for applying a laminating film 26 over the printed image on the receptor surface 20 of the receptor card 14, and an exit station generally indicated at 28 for outputting the receptor card 14. Each of the above-described assemblies is mounted on a substantially rigid frame structure generally indicated at 30.

Figure 3:
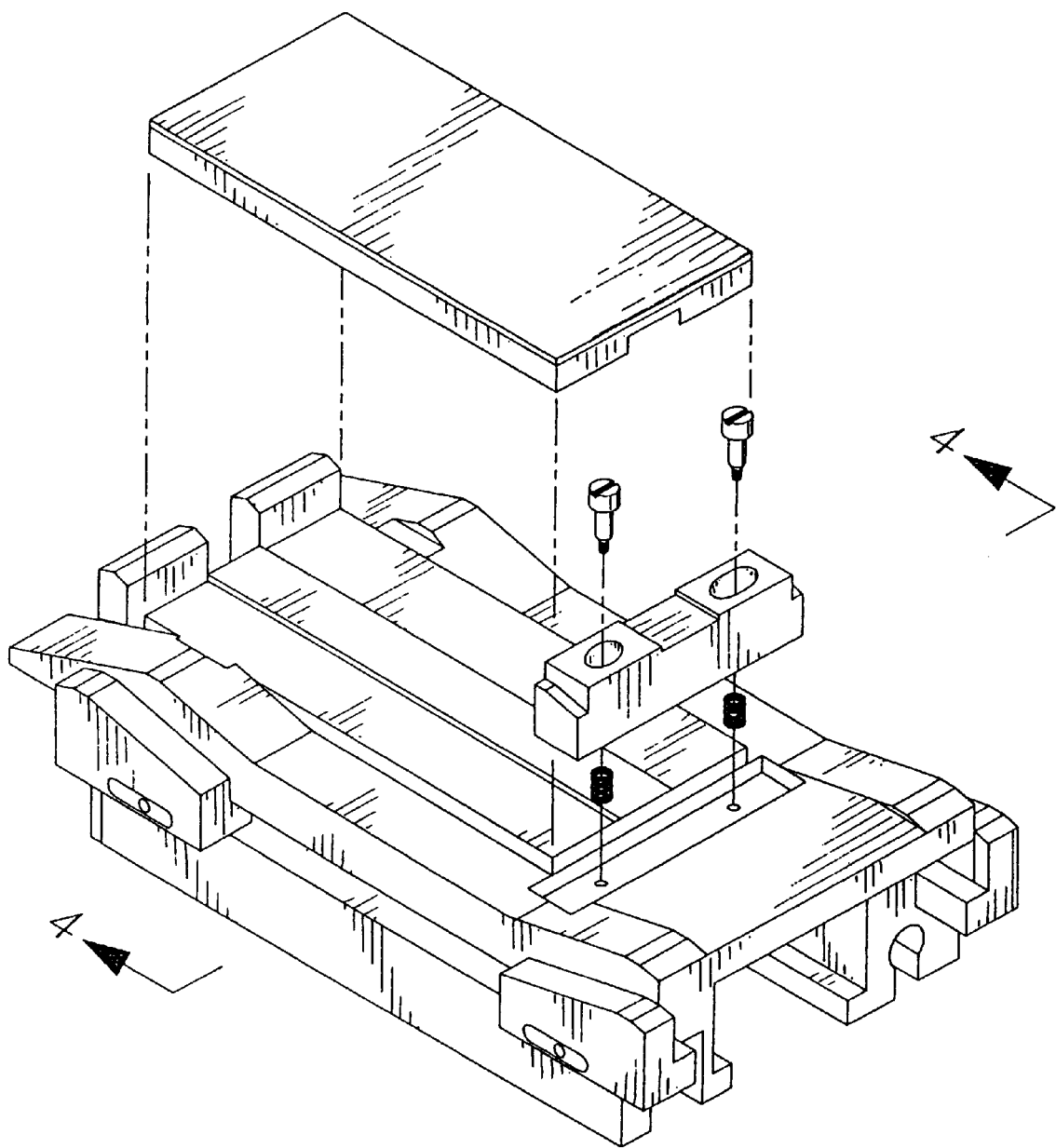
FIG. 3 is an exploded perspective view of the carriage assembly showing the card platen and stop block.
Figure 4:
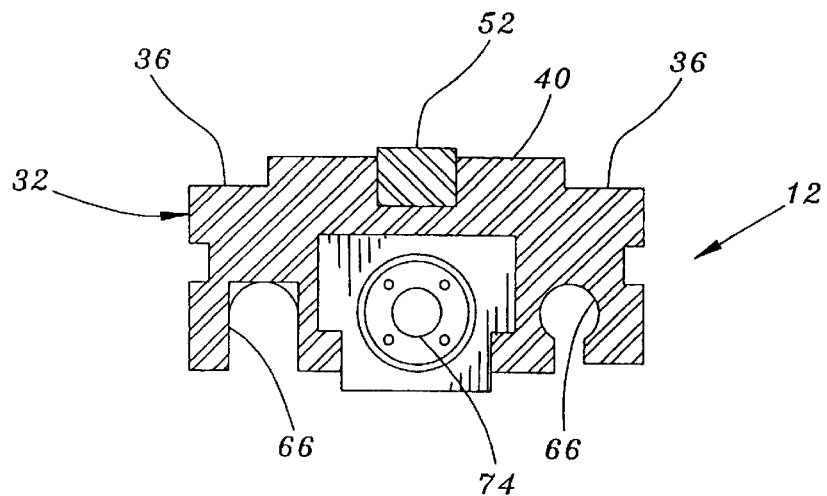
FIG. 4 is a cross-sectional view thereof taken along line 4—4 of FIG. 3.

Referring to FIGS. 3–4, the carriage assembly 12 comprises a body portion generally indicated at 32, and a card platen generally indicated at 34. The body portion 32 is generally rectangular in configuration and includes integrally formed symmetrical cam surfaces 36 extending from the front to the rear end of the body portion 32 along the side edges thereof. The cam surfaces 36 are operative for lifting and lowering the printhead assembly 22, which operation will be described hereinafter. Symmetrical cam blocks 38 are attached to the sides of the carriage body 32 to form a second set of cam surfaces 39 at the front and rear of the carriage body 32 for lifting and lowering the laminating roller assembly 24. The card platen 34 is received onto an upper surface 40 of the carriage body 32 between a pair of upwardly extending spaced projections 42 at the rear of the carriage body 32 and a stop block 44 mounted adjacent the front of the carriage body 32. The card platen includes a rigid plate 46 having a longitudinal groove 48 in the underside thereof, and a resilient card receiving surface 50 for receiving the receptor card 14 with the receptor surface 20 facing upwardly. The rigid plate 46 is received onto the upper surface 40 of the carriage body 32 wherein the longitudinal groove 48 is guided along a longitudinal ridge 52 formed thereon. The longitudinal distance between the projections 42 and the stop block 44 is slightly longer than the card platen 34 to allow some longitudinal movement of the card platen 34 with respect to the carriage body 32. The stop block 44 is mounted in a recess 54 in the carriage body 32 by means of two threaded fasteners 56 received through openings 58 in the stop block 44 and into threaded bores 60 positioned within the recess 54. The stop block 44 is normally biased to an upwardly extending position by means of springs 62 received around the threaded fasteners 56 and captured between the bottom of the stop block 44 and the carriage recess 54. The height of the rear projections 42 and the stop block 44 is slightly more that the height of the card platen 34 so that when a card 14 is received on top of the card receiving surface 50, the receptor surface 20 of the card 14 is within the same plane as the top of the projections 42 and stop block 44.

Figure 2:
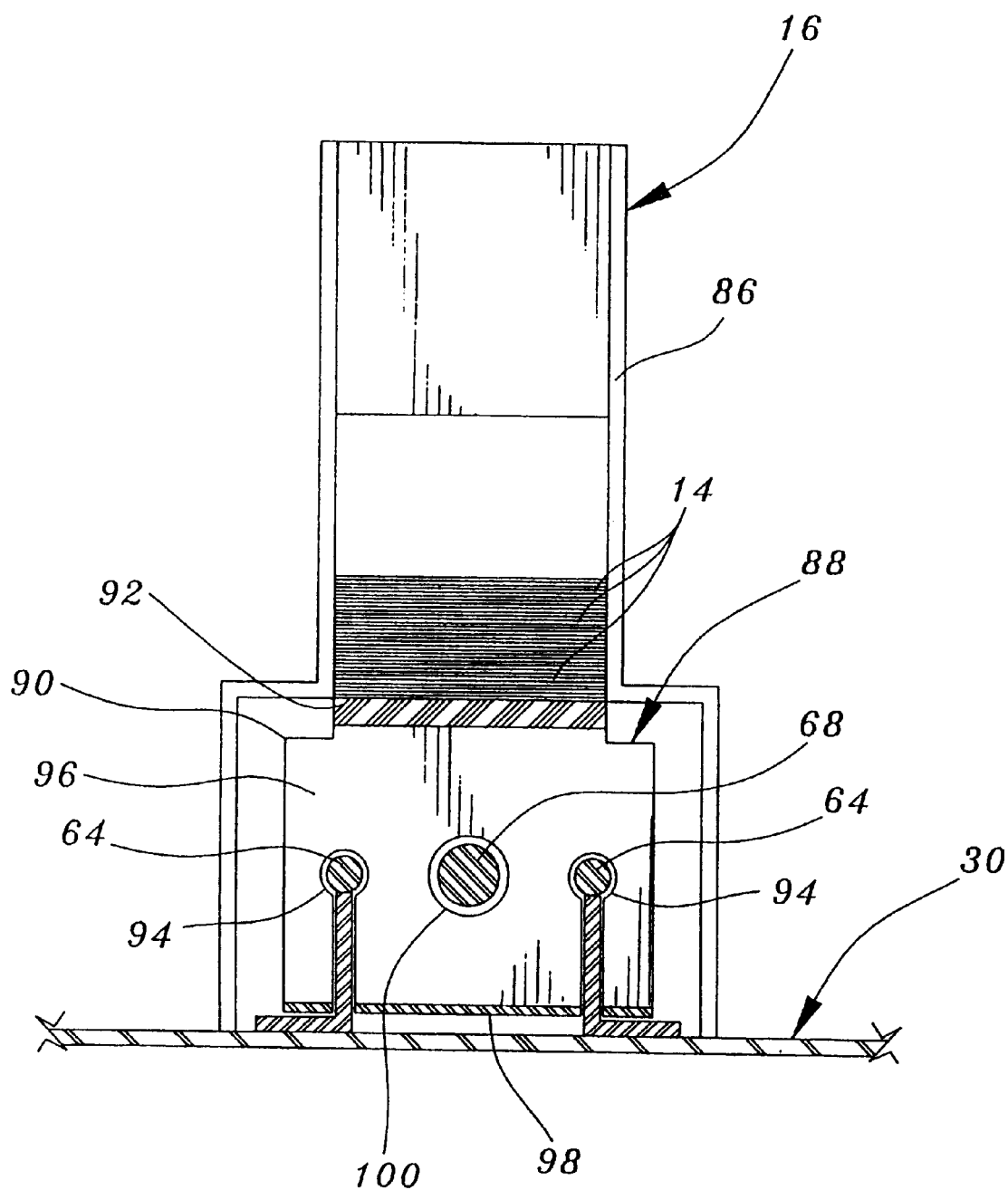
FIG. 2 is a cross-sectional view thereof taken along line 2—2 of FIG. 1.

The carriage 12 is guided through the successive stations of the apparatus 10 on a pair of parallel guide rails 64 which are secured to the frame 30 of the apparatus 10. The guide rails 64 extend through parallel grooves 66 formed along the bottom of the carriage body 32. The carriage 12 is driven by a threaded rod 68 rotatably mounted in bearing assemblies 70 attached to vertical walls 72 at the ends of the frame 30. The threaded rod 68 is positioned between the two guide rails 64 (See FIG. 2) and passes through an inwardly threaded cylinder 74 mounted in the center of the carriage body 32. A reversible motor 76 (FIG. 1) is operative for rotating the threaded drive rod 68 for forward and backward movement of the carriage 12 along the guide rails 64. More specifically, the drive shaft 78 of the motor 76 includes a first pulley 80 and the end of the threaded rod 68 includes a second pulley 82. A drive belt 84 is extended around the two pulleys 80, 82 to transfer rotation of the drive shaft 78 to the threaded rod 68.

The hopper assembly 16 comprises two sheet metal formations 86 which cooperate to define a vertically disposed, generally rectangular chute in which a plurality of horizontally disposed receptor cards 14 are maintained in stacked relation. The bottom portion of the hopper 16 is open in the longitudinal direction to allow longitudinal movement of a truck assembly generally indicated at 88 beneath the stacked cards 14. The truck assembly 88 (FIG. 2) comprises a U-shaped sheet metal body portion 90 which is slidably mounted on the guide rails 64, and further comprises a top plate 92. More specifically, the guide rails 64 pass through slotted cutouts 94 in the end walls 96 and bottom wall 98 of the truck 88. The threaded drive rod 68 passes through openings 100 in the end walls 96 of the truck 88. The truck 88 is normally disposed directly beneath the stacked cards 14 wherein the top plate 92 engages the lowermost card to maintain the cards 14 within the hopper 16. The truck 88 is not actuated by the threaded rod 68, however, it is spring biased for forward movement (movement to the right in FIG. 1) along the guide rails 64. In this regard, one end of a spring 102 (FIG. 1 broken lines) is attached to the front end of the truck 88 while the other end is attached to a rod 104 (broken lines) extending between the guide rails 64 adjacent the printhead assembly 22 in the center of the apparatus 10. Forward movement of the truck 88 past the front wall of the hopper is prevented by a stop arm (not shown) so that the truck 88 is normally positioned directly beneath the hopper 16.

In operation, the carriage 12 is normally disposed directly to the right of the hopper 16, as illustrated in FIG. 1. In order to pick a card 14 from the hopper 16 for printing and lamination, the carriage 12 is driven rearwardly (to the left in FIG. 1), so that it passes underneath the hopper 16. Movement of the carriage 12 to the left displaces the truck 88 to the left along the guide rails 64. During movement of the truck 88, the card platen 34 is positioned directly beneath the lowermost card. As stated previously, the rear projections 42 on the carriage 12 extend upwardly slightly above the surface 50 of the card platen 34. Accordingly, when the rear projections 42 are moved completely to the left of the hopper 16, i.e. out from underneath the lowermost card, the lowermost card is dropped onto the card receiving surface 50 of the platen 34 with the rear projections 42 now engaging the rear edge of the card 14. The rear edge of the rear projections 42 are provided with a slight chamfer 106 toward the rear to facilitate rearward movement of the carriage 12 beneath the card 14 in the hopper 16. In this manner, a single receptor card 14 is removed from the hopper 16 and positioned on card platen 34.

Figure 5:
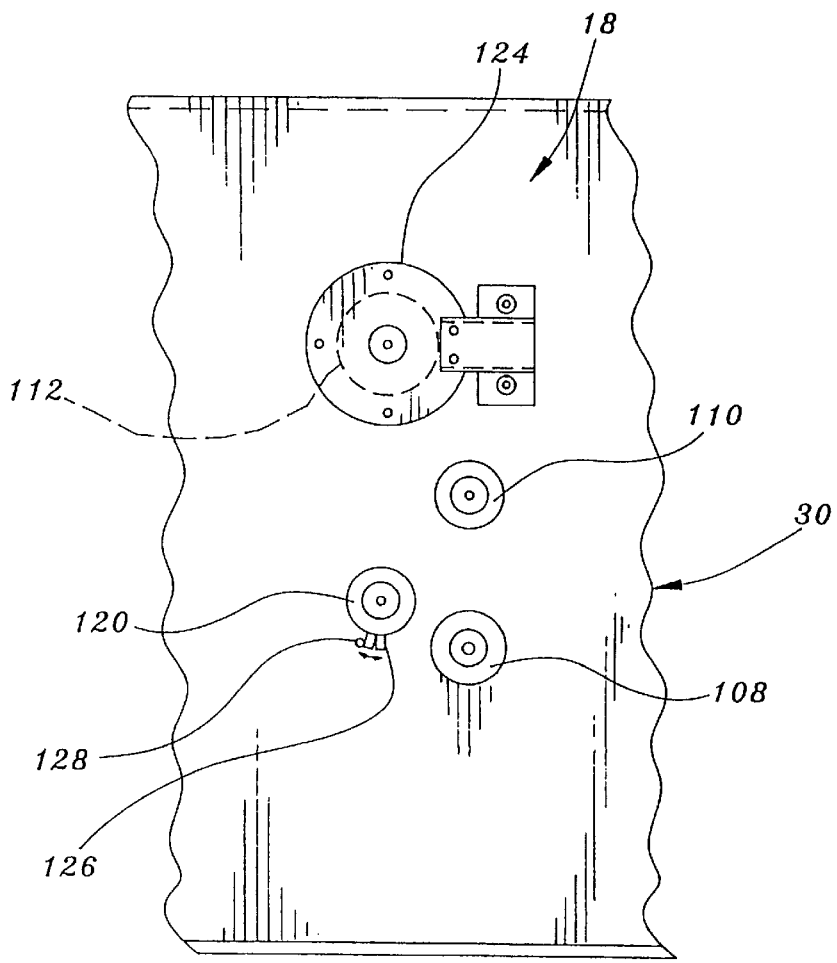
FIG. 5 is a rear view of the cleaning station.

The carriage 12 is then driven forwardly toward the cleaning assembly 18. Since the card truck 88 is spring biased for forward movement, the truck 88 will follow the carriage 12 back into its normal position beneath the hopper 16 as the carriage 12 moves toward the cleaning station 18. As the carriage 12 moves forwardly, the receptor card 14 is passed beneath a silicone roller 108 rotatably mounted to the frame 30 so that the outer surface thereof makes rolling engagement with the receptor surface 20 of the receptor card 14. The silicone roller 108 is conventionally operative for lifting dirt and dust particles from the surface of the receptor card 14 to provide a clean surface for printing and laminating. As is well known in the art, silicone rollers become dirty very quickly and need to be cleaned with an adhesive tape 109 to remove the dirt and dust from the outer surface of the roller. Cleaning of the silicone roller 108 is accomplished by means of a tape assembly including a tape supply roll 110, a tape take up roll 112, and a pivot arm 114. The pivot arm 114 comprises a flat planar panel having a width generally equal to the length of the silicone roller 108, i.e. about the same as the width of the receptor card 14. The arm 114 includes a planar first portion 116 and a generally arcuate end portion 118. The first portion 116 is rotatably mounted to the frame 30 on a bearing assembly 120 so that the end portion 118 is situated directly above the silicone roller 108. The tape 109 winds off of the supply roll 110 and around the pivot arm 114 and onto the take up roller 112 generally as illustrated in FIG. 1. The pivot arm 114 is normally biased by a spring 122 to a first position wherein the tape 109 is not in engagement with the roller 108. However, when it is needed to clean the surface of the roller 108, the take up roll 112 is rotated by a motor 124 (FIG. 5). Winding of the tape 109 onto the take up roll 112 tensions the tape 109 and causes the pivot arm 114 to pivot about the bearing assembly 120 wherein the tape 109 at the end portion 118 of the arm 114 moves into engagement with the roller 108. Downward movement of the pivot arm 114 is controlled by a pin 126 mounted on the pivot shaft 120. The pin 126 engages a stop pin 128 on the frame 30 to limit rotation of the pivot shaft 120 (FIG. 5). After a complete revolution of the silicone roller 108, the tape 109 is disengaged from the roller 108. In normal operation of the apparatus 10, the silicone roller 108 is cleaned after every five to ten card cleanings.

Figure 11:
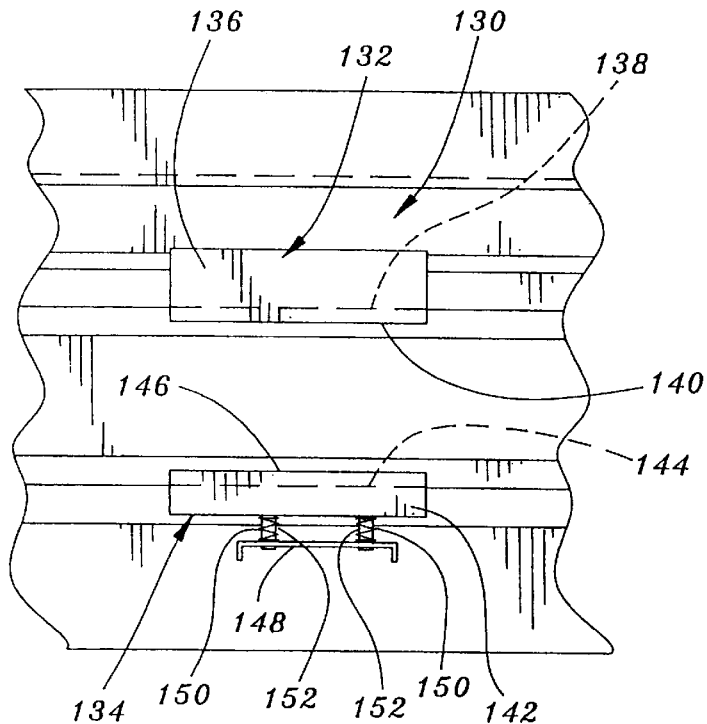
FIG. 11 is a top view of the card guide assembly for guiding the card into the print station.

The carriage 12 is further driven to the right so that the card is transported beneath the printhead assembly 22. However, prior to passing beneath the printhead assembly 22, the card is passed through a card guide assembly 130. Referring to FIG. 11, a top view of the guide assembly 130 is illustrated in top view. The guide assembly 130 comprises an inner fixed guide rail 132 and an outer spring biased guide rail 134. The inner rail 132 has a body portion 136 with a vertical side edge 138 (broken lines) operable for engaging the side edge of the card 14, and further has a horizontally extending ledge portion 140 extending inwardly from the body portion 136 to engage the top surface of the card 14. The inner guide rail 132 is securely mounted to the frame 30. The outer guide rail 134 also has a body portion 142 with a vertical side edge 144 (broken lines) operable for engaging the side edge of the card 14, and also has a horizontally extending ledge portion 146 extending inwardly from the body portion 142 to engage the top surface of the card 14. The outer guide rail 134 is slidably mounted to a sheet metal wall 148 by rods 150. Spring 152 are captures between the guide rail body 142 and the sheet metal wall 148 to bias the guide rail 134 inwardly. As the carriage 12 is driven to the right, the card 14 passes beneath the ledge portions 140, 146 and between the body portions 136, 142. The spring biased outer rail 134 squeezes the card 14 against the inner rail 132 to frictionally move the card 14 rearwardly on the carriage 12 into firm engagement against the rear projections 42 of the carriage 12. The guide assembly 130 thus positions the card 14 in the rearwardmost possible position on the carriage 12. This position is necessary for proper alignment and positioning of the printed image onto the card surface 20.

Figure 6:
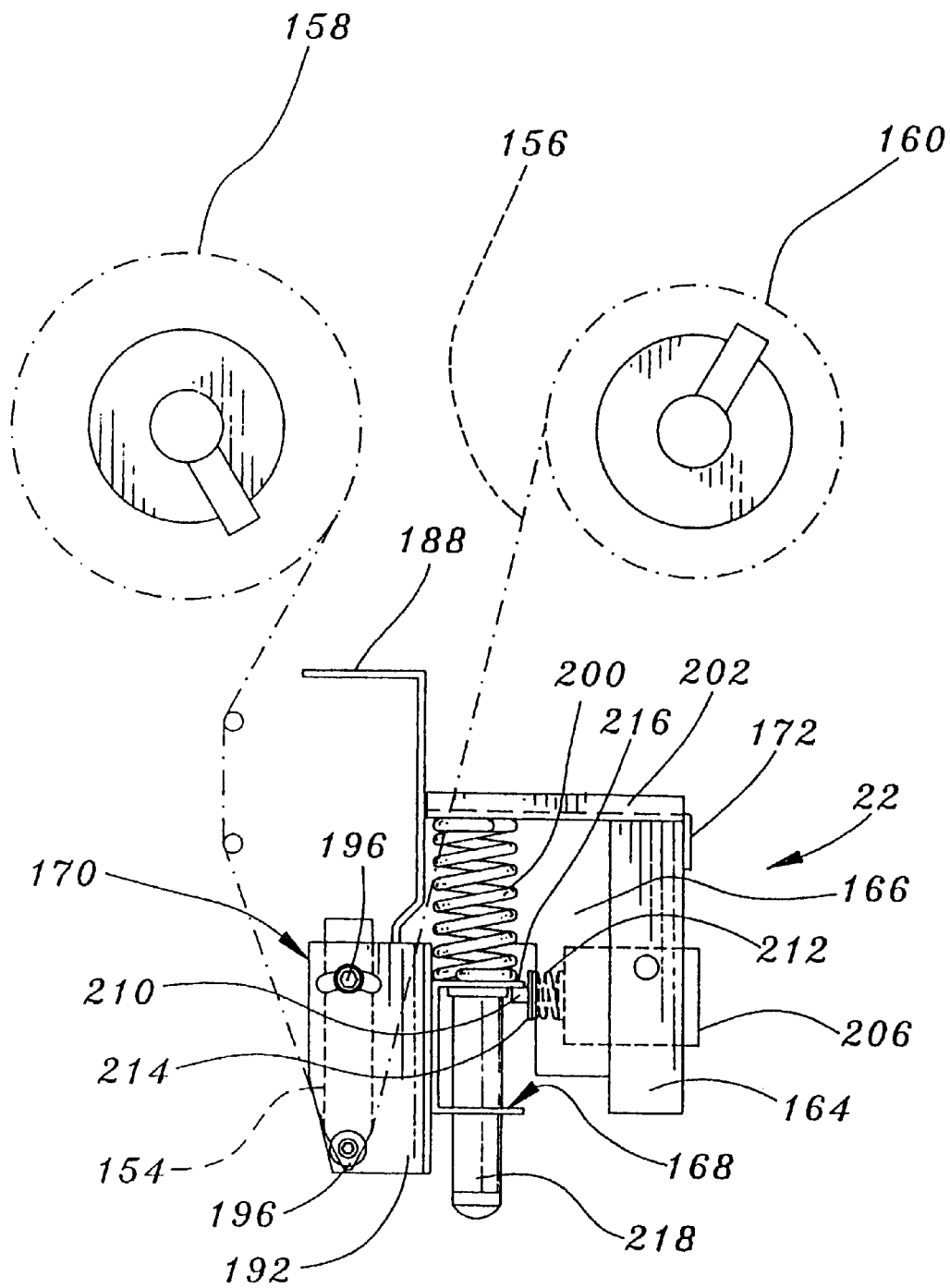
FIG. 6 is an enlarged side elevational view of the printing assembly.
Figure 7:
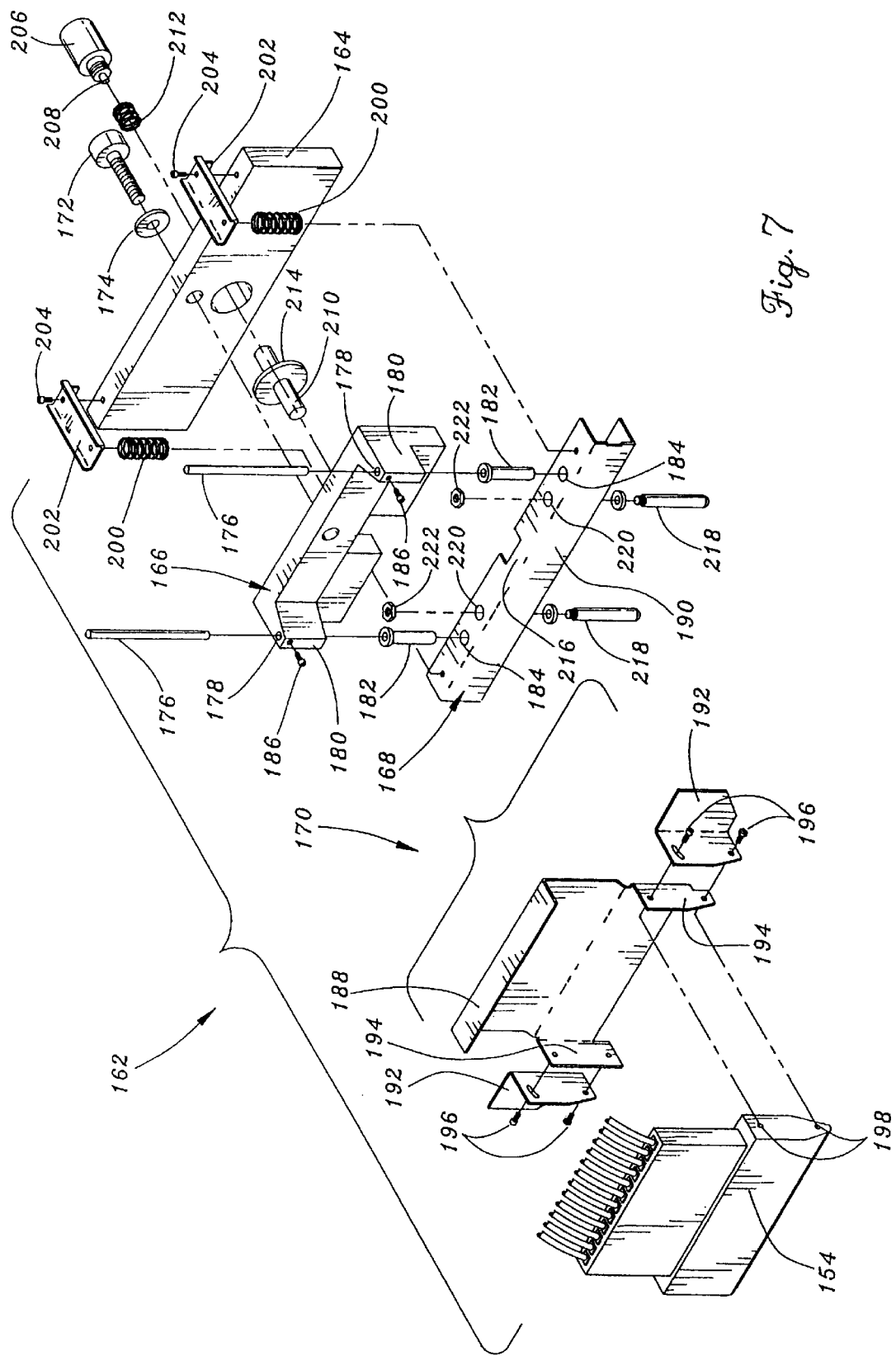
FIG. 7 is an exploded perspective view thereof.

Referring to FIGS. 6–10, the printhead assembly 22 utilizes an edge-type thermal printhead 154 for printing an image onto the receptor surface 20 of the receptor card 14. The thermal print assembly 22 uses a conventional thermal dye transfer printing method wherein a thermal transfer ribbon 156 passes intermediate the printhead 154 and the receptor surface 20 of the receptor card 14 for thermally transferring die from the ribbon 156 onto the receptor surface 20 of the card 14. The transfer ribbon 156 is supplied by a ribbon supply assembly including a supply roll 158, and a take-up roll 160. The take-up roll 160 is driven in a conventional manner by a stepper motor (not shown) to take up used ribbon. The ribbon 156 includes a plurality of colored panels reoccurring in a repetitive pattern. In order to achieve a full color image on the receptor card 14, the card 14 must be passed underneath the printhead 154 three separate times for successive printing of each of the colored ribbon panels, i.e. cyan, magenta, and yellow. In this regard, the printhead 154 is movable between a printing position wherein the printhead 154 is positioned for engagement with the receptor surface 20 of the receptor card 14, and an idle position wherein the printhead 154 is lifted out of engagement with the receptor card 14. More specifically, the printhead 154 is mounted on a mounting assembly 162 (FIG. 7) including a rigid support arm 164, a mounting block generally indicated at 166 pivotably mounted to the support arm 164, a channel member 168, and a carrier assembly generally indicated at 170. The mounting block 166 is pivotably mounted to the support arm 164 by means of a threaded fastener 172 and washer 174. The channel member 168 is slidably mounted to the pivot block 166 by dowels 176 which pass through openings 178 in arm portions 180 of the pivot block 166 and through sleeves 182 which are mounted in openings 184 in the channel member 168. The guide dowels 176 are locked in position by means of set screws 186. The channel member 168 is thus slidably movable up and down along the dowels 176 with respect to the pivot block 166. The carrier assembly 170 includes a backplate 188 which is fixedly mounted to the front wall 190 of the channel member 168 and two side panels 192 which are mounted to side walls 194 of the backplate by fasteners 196. The fasteners 196 pass through the sidewalls 192, 194 and into threaded openings 198 in the sides of the printhead 154 to mount the printhead 154 in the carrier assembly 170. The mounting assembly 162 includes springs 200 for normally biasing the printhead 154 downwardly to the printing position. More specifically, the springs 200 are captured between mounting arms 202 mounted by fasteners 204 to the top of the support arm 164 and the end portions of the channel member 168. Since the support arm 164 is fixed in position, the springs 200 effectively push the channel member 168 downwardly along the guide dowels 176. However, the printhead 154 is selectively maintained in an idle position by a solenoid 206 mounted in the pivot block 166. The solenoid 206 is conventional in the art, having a plunger 208 which is drawn inwardly in response to electric current. A capture pin 210 is mounted on the end of the solenoid plunger 208, and a spring 212 is captured between a flange 214 on the capture pin 210 and the solenoid body 206 to normally bias the pin 210 to a fully extended position. Referring to FIG. 6, when the capture pin 210 is fully extended, it projects beneath the upper wall 216 of the channel member 168 to prevent downward movement of the printhead 154.

Figure 8:
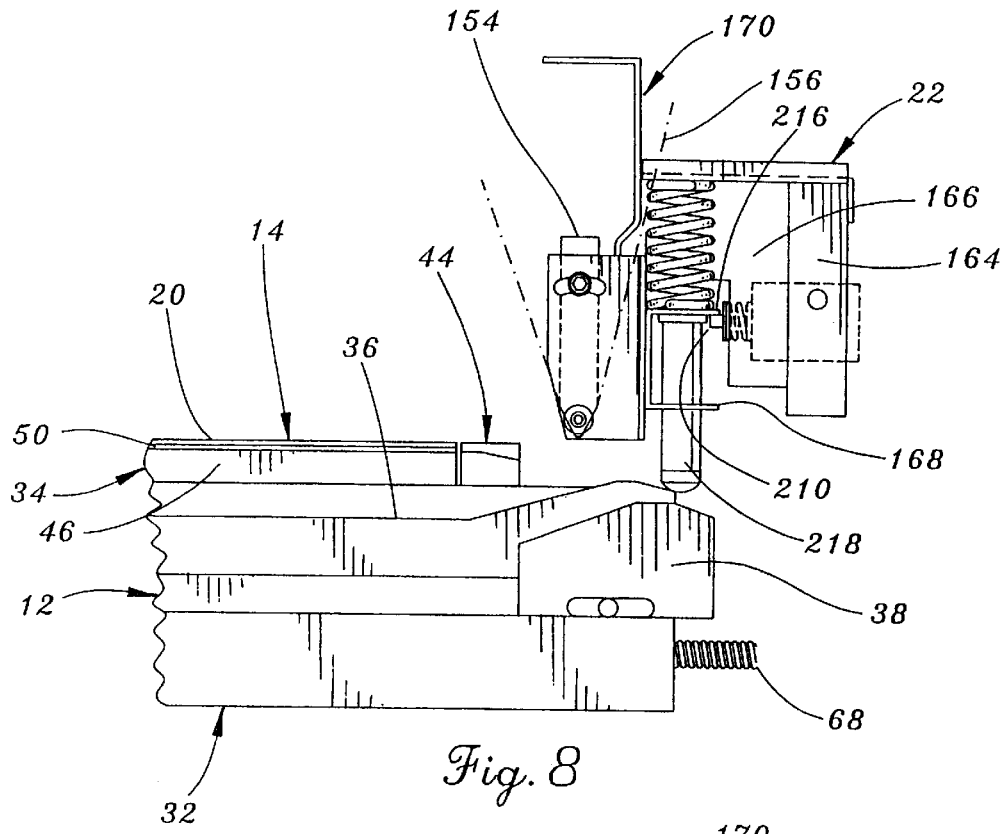
FIG. 8 is an enlarged side view of the carriage showing engagement of the cam followers with the cam surfaces on the carriage body.
Figure 9:
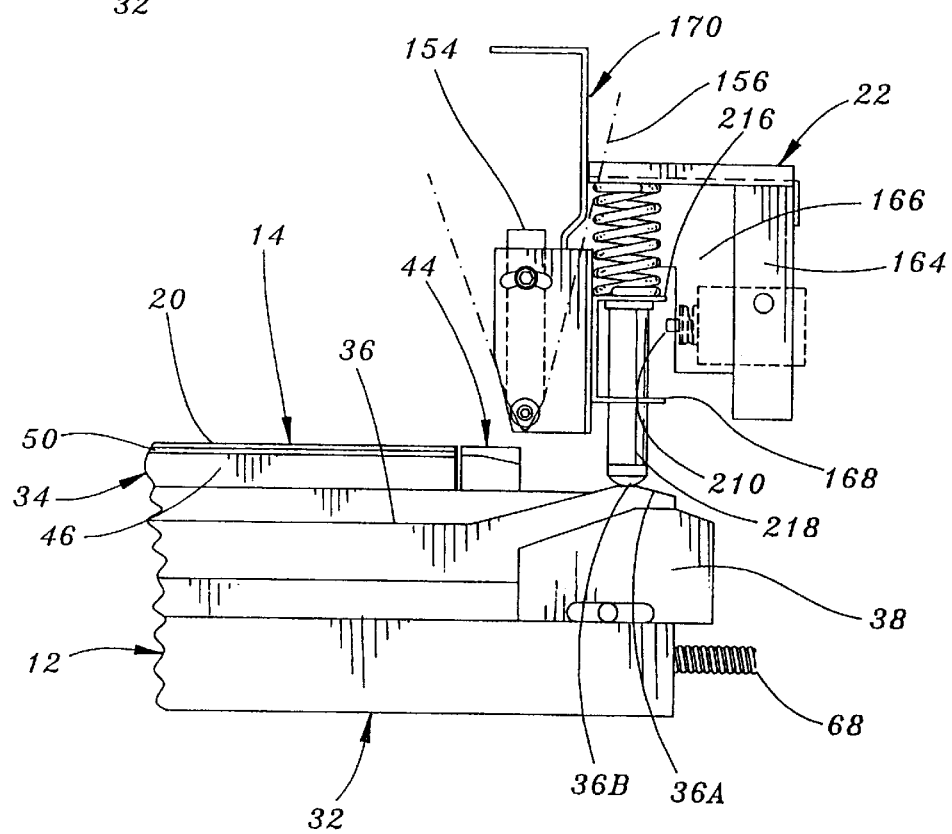
FIG. 9 is another view thereof showing the printhead assembly in a lifted position.
Figure 10:
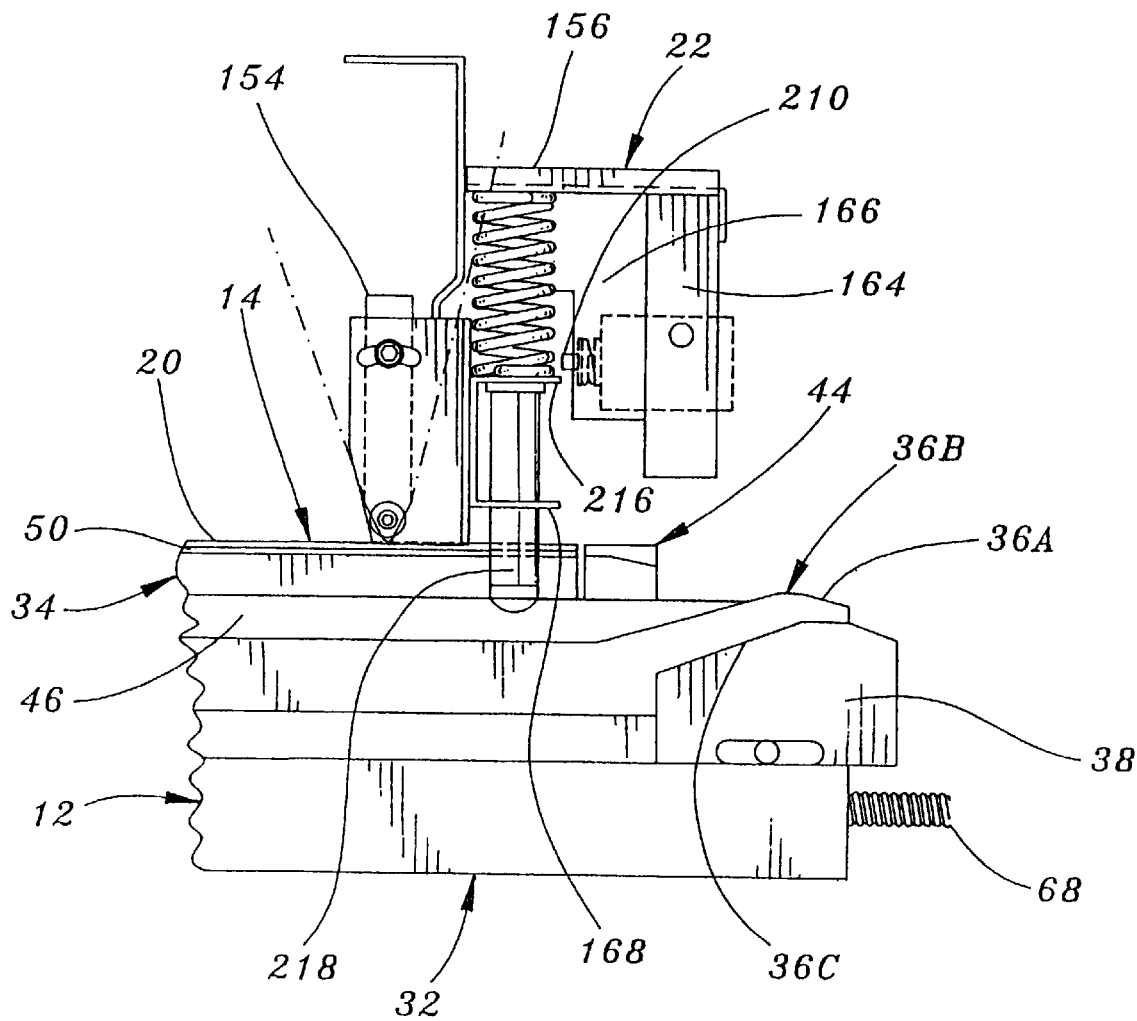
FIG. 10 is yet another view thereof showing the printhead assembly in engagement with the receptor card.

Movement of the printhead 154 between the idle position and the printing position is accomplished by means of spaced follower pins 218 mounted on the channel member 168. More specifically, the pins 218 extend through openings 220 in the channel member 168 and are secured by threaded nuts 222. The pins 218 are spaced so as to engage and ride on the cam surfaces 36 of the carriage 12. Referring to FIGS. 8, 9, and 10, a full printing cycle will now be described. In FIG. 8, the printhead 154 is shown in its normal idle position with the pins 218 positioned just forwardly of the cam surfaces 36. Turning to FIG. 9, forward movement of the carriage 12 causes the pins 218 to ride upwardly along the cam slope 36A forcing the channel member 168 (upper wall 216) upwardly out of engagement with the solenoid pin 210. At the apex 36B of the front cam surface 36 the solenoid 206 is energized to retract the pin 210 out of the way so that the channel member 168 can now move downwardly. Turning to FIG. 10, further forward movement of the carriage 12 causes the pins 218 to ride downwardly along the cam slope 36C to lower the printhead 154 into contact with the receptor surface 20 of the card 14. Further movement of the carriage 12 forwardly moves the printhead 154 along the surface 20 of the receptor card 14 to print an image thereon. The corresponding cam surfaces 36 at the rear of the carriage 12 lift the printhead 154 upwardly out of engagement with the receptor card 14. When the pins 218 are positioned at the apex 36B of the rear cam surface 36, the solenoid 206 is de-energized to release the plunger 208 wherein the spring 212 forces the capture pin 210 back to its normal extended position. Thus, when the pins 218 ride downwardly on the rear cam surface 36, the capture pin 210 re-catches the channel member wall 216 to maintain the printhead 154 in the idle position.

Since color printing is achieved by a three-pass printing process, the printing cycle must reoccur three successive times. Successive printing occurs by driving the carriage 12 forward and backward along the rails three consecutive times wherein the printhead 154 is successively lowered from the idle position into the printing position during forward movement of the carriage 12, and lifted to and maintained in the idle position during rearward movement of the carriage 12. More specifically, the carriage 12 is driven rearwardly back to a position to the left of the printhead 154, the transfer ribbon 156 is advanced to the next color panel, and then the carriage 12 is driven forwardly to print the second color. As stated previously, when the carriage 12 passes through the guide assembly 130, the guide assembly 130 repositions the card 114 to the rearwardmost position on the carriage 12 so that proper print registration may be maintained in successive passes.

Figure 12:
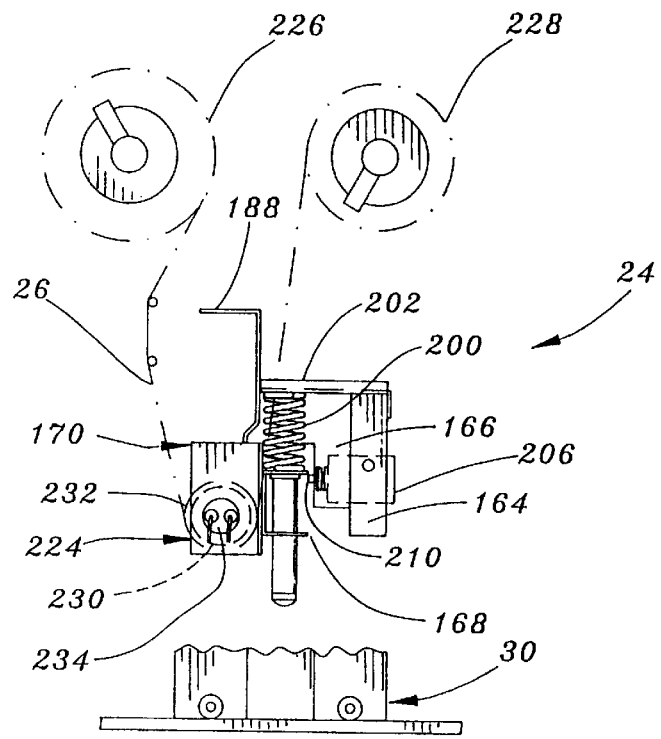
FIG. 12 is as an enlarged side elevational view of the laminating assembly.

To laminate the printed card 14, the carriage 12 is moved further forwardly to transport the receptor card 14 beneath the laminating assembly 24. In this regard, a laminating film 26 passes intermediate a heated laminating roller assembly 224 and the receptor card 14 during the laminating operation for overlaying a clear or holographic protective overlay film onto the printed surface 20 of the card 14. The laminating film supply assembly comprises a supply roll 226, and a take-up roll 228 which is driven by a conventional stepper motor (not shown). It is pointed out that a second guide assembly 130 (FIG. 1) is positioned between the printhead assembly 22 and the laminating assembly 24 to insure proper positioning of the receptor card 14 when entering the laminating assembly 24. The laminating assembly 24 is basically identical in structure and function to the printhead assembly 22 except that instead of a printhead mounted on the carrier assembly 170, a heated laminating roller assembly 224 is mounted on the carrier 170. The laminating roller assembly comprises a hollow steel shaft 230 (broken lines FIG. 12) rotatably mounted to the carrier 170, and a resilient outer surface cover 232. A conventional cartridge-type heater 234 is inserted into the center of the hollow shaft 230 to heat the roller assembly 224 to the desired temperature for the laminating film 26. The roller assembly 224 is lifted and lowered onto the surface 20 of the receptor card 14 in the same manner as the printhead 154, with the exception that the follower pins 218A ride on the outer cam block surfaces 39 to effect upward and downward movement of the roller assembly 224. In other words, the pins 218A are spaced slightly farther apart on the roller mounting assembly. Furthermore, the pins 218A are slightly longer to accommodate the lower positions of the cam surfaces 39. However, the pins 218A and cam surfaces 39 function virtually identical to the printhead assembly for lifting and lowering of the laminating roller assembly 224.

Referring now to FIGS. 13–16, the carriage 12 then transports the receptor card 14 to a pair of output nip rollers generally indicated at 236 via exit channel assembly 28. It is noted that the heat applied to the upper surface 20 of the card 14 stresses the plastic, and causes it to curve upwardly. The exit channel assembly 28 effectively maintains the card 14 in a relatively flat configuration while passing the card 14 to the output rollers 236. In this regard, the upper nip roller 238 comprises a conventional solid roller, while the lower nip roller generally indicated at 240 comprises a hollow steel shaft 242, having a resilient outer surface coating 244. A conventional cartridge-type heater 246 is inserted into the hollow shaft 242 to heat the roller assembly 240 and apply heat to the lower surface 248 of the receptor card 14. Heating of the lower surface 248 of the card 14 balances the thermal stresses on the plastic so that the card 14 exits the apparatus 10 in a substantially flat configuration.

Figure 13:
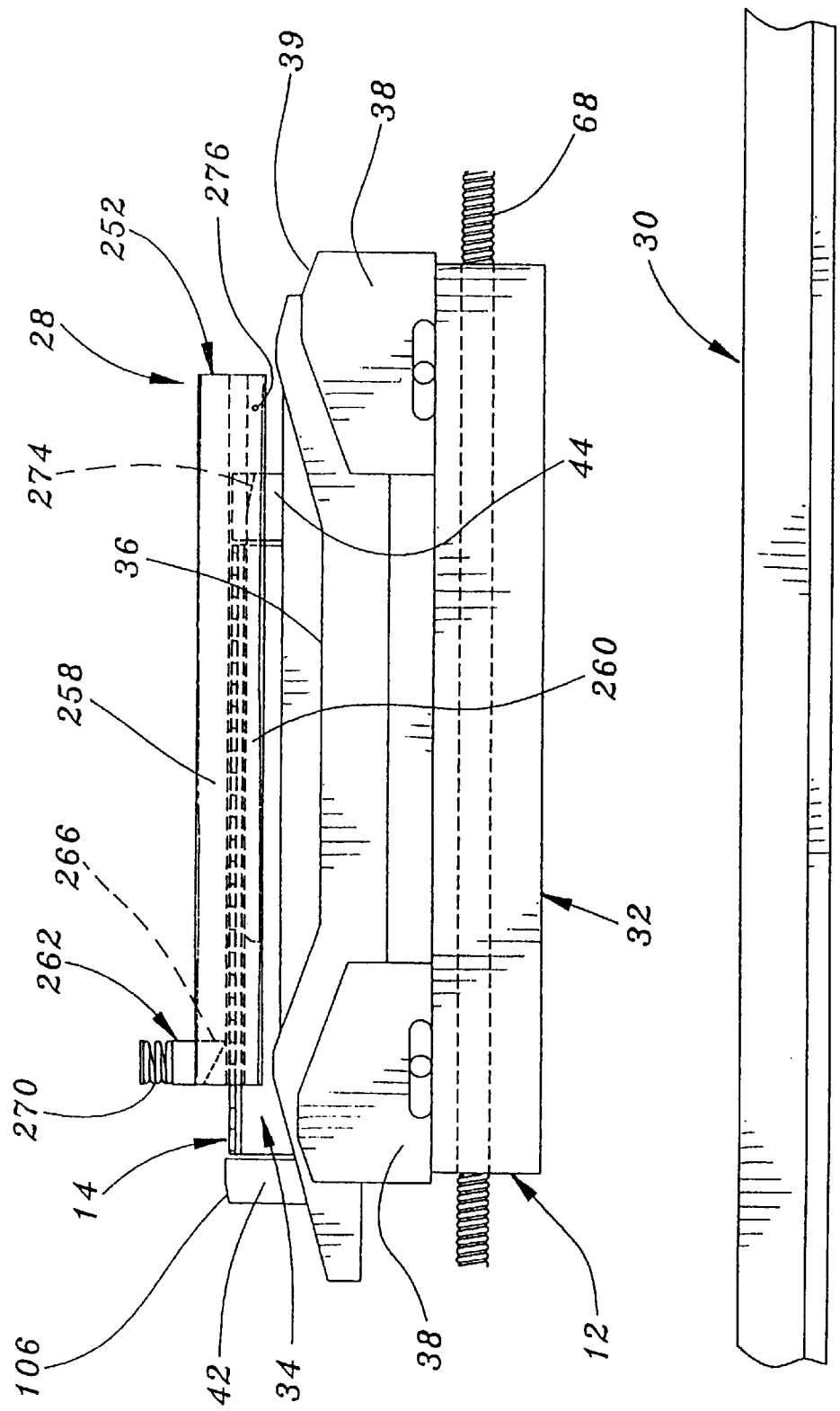
FIG. 13 is an enlarged side view of the transport carriage guiding the receptor card into the exit station.
Figure 14:
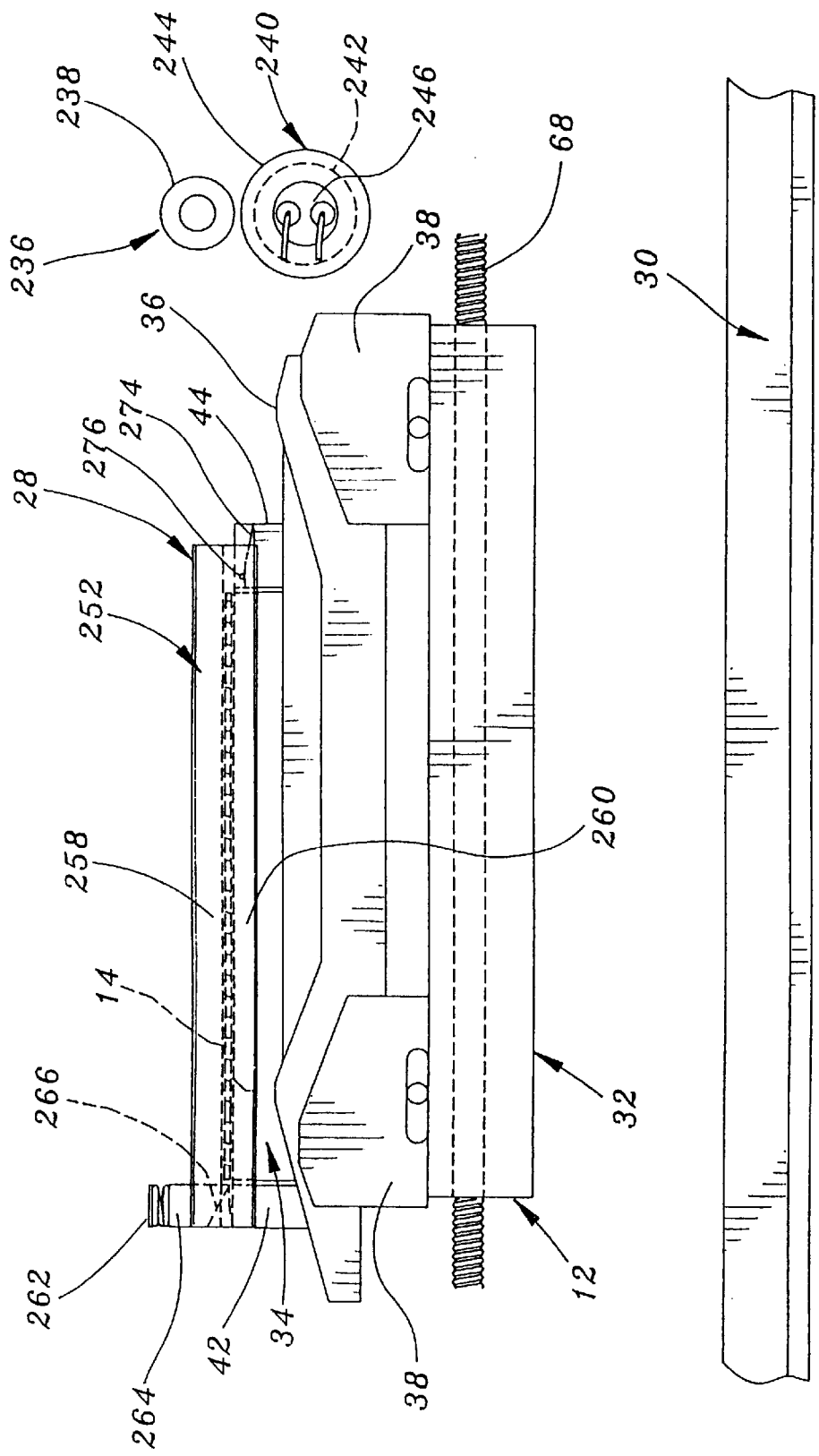
FIG. 14 is an other view thereof showing the stop block depressed and the card ready for exit.
Figure 15:
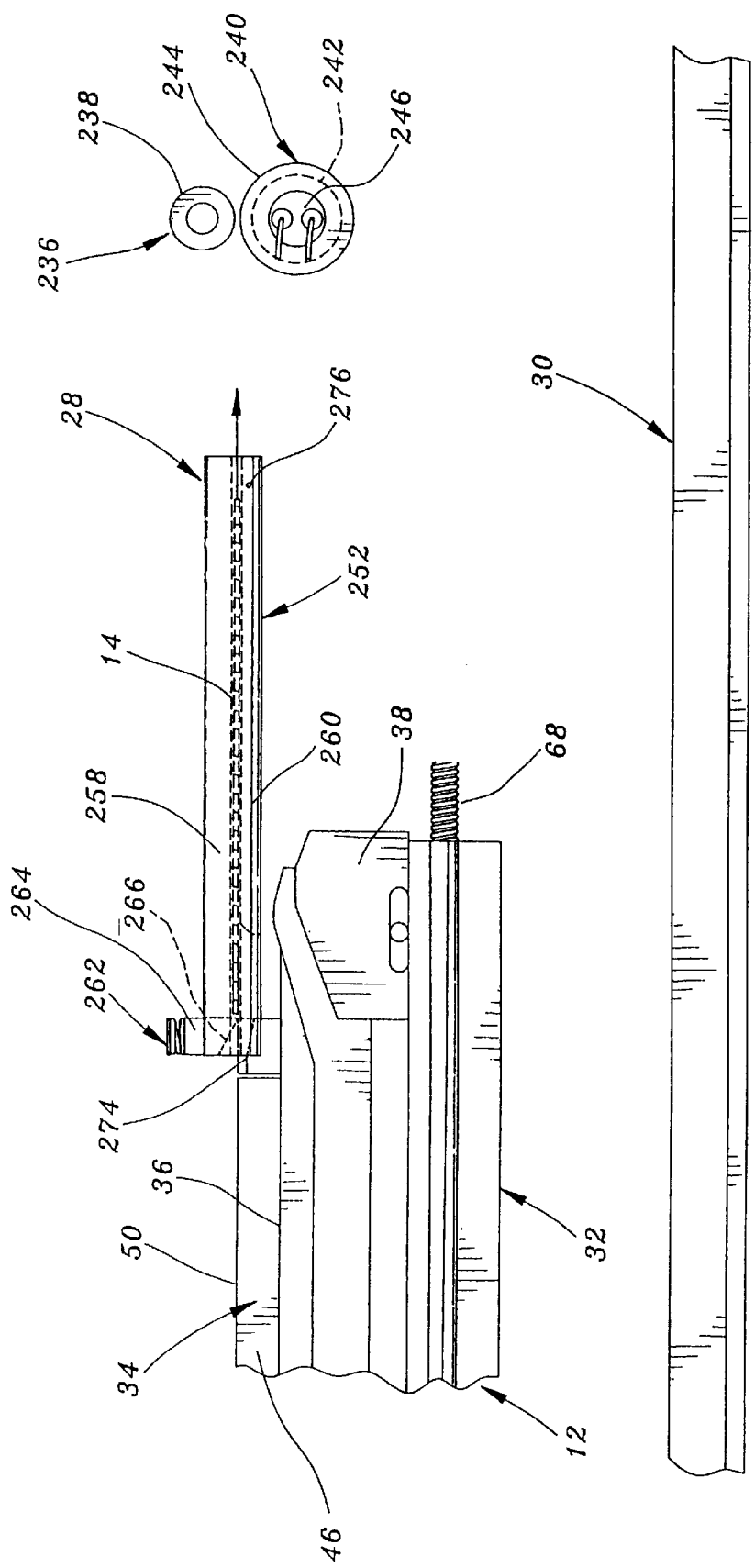
FIG. 15 is yet another view thereof showing the carriage retracted and ready to push the receptor card outwardly through the nip rollers.
Figure 16:
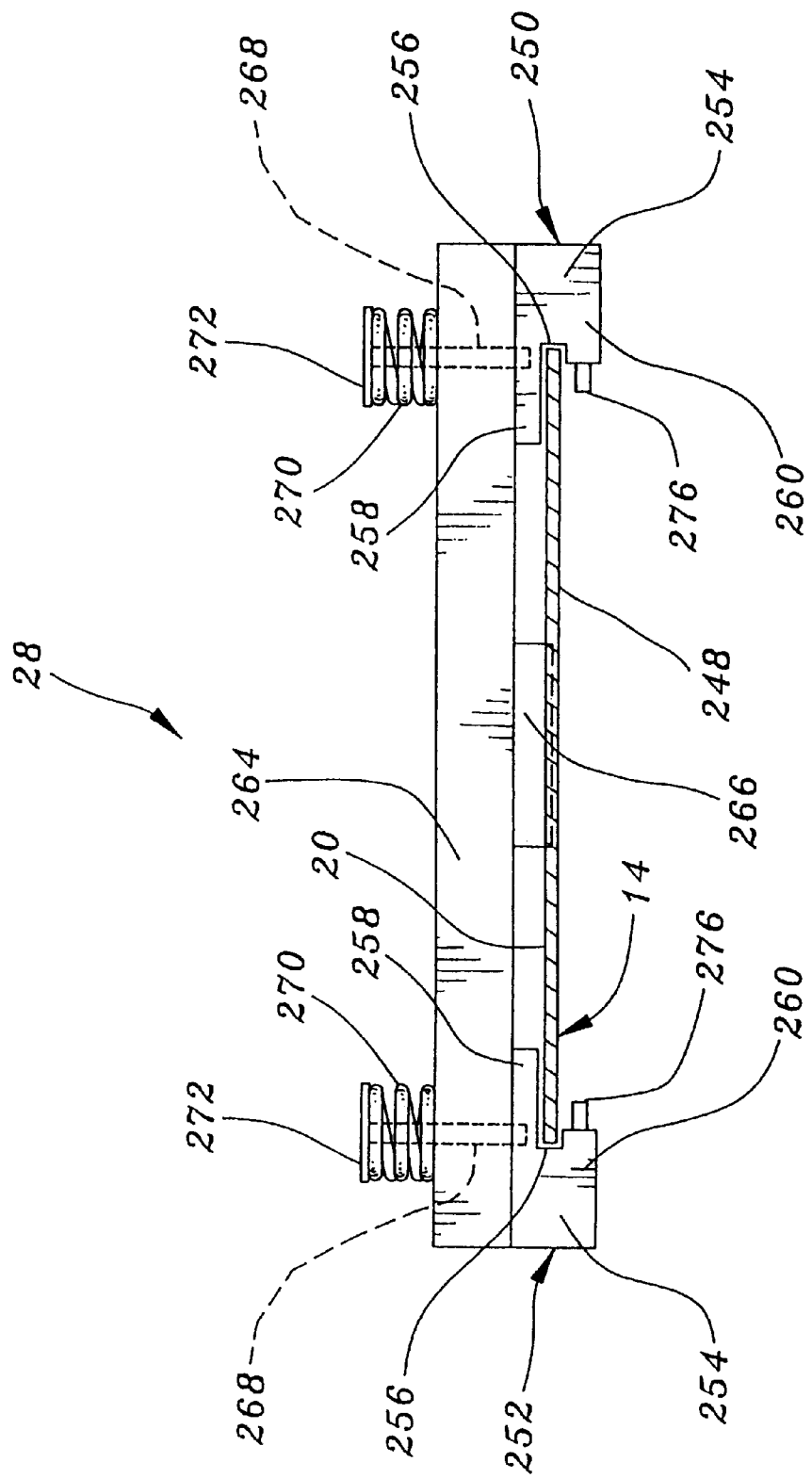
FIG. 16 is a cross-sectional view thereof taken along line 16—16 of FIG. 15.

Still referring to FIGS. 13–16, the exit channel assembly 28 comprise inner and outer fixed channel members 250, 252. The channel members 250, 252 each comprise a body portion 254 having a vertical edge surface 256 for engaging the side surfaces of the card 14, and an upper ledge 258 for engaging the upper surface 20 of the card 14. The channel members 250, 252 further include a lower ledge portions 260 for engaging the lower surface 248 of the card 14. The upper and lower ledges 258 260 cooperate to maintain the card 14 in a relatively flat configuration after being removed from the surface of the card platen 34. Turning to FIG. 13, the carriage 12 is driven forwardly to position the card between the exit channels 250, 252. A picking member generally indicated at 262 disposed at the rear end of the exit channels 250, 252 rides on top of the receptor surface 20 of the card 14 until the card 14 is fully positioned within the exit channels 250, 252. The picking member 262 comprises a bar 264 which extends laterally between the two channel members 250, 252. The center of the bar 264 includes a downwardly extending chamfered pick 266. The bar 264 is mounted to the channel members 250, 252 by threaded fasteners 268 which pass through openings in the bar 264 and into threaded bores in the top of the channel members 250, 252. Springs 270 are captured between the heads 272 of the threaded fasteners 268 and the bar member 264 to normally bias the bar 264 and pick 266 downwardly. As the card 14 passes underneath the pick 266, the pick 266 rides on top of the card 14. However, when the pick 266 reaches the end of the card surface (FIG. 14) it drops down into a position wherein it engages the rear edge of the card 14. Simultaneously, cam surfaces 274 on the side edges of the stop block 44 engage with pins 276 extending inwardly from the lower ledges 260 of the exit channel members 250, 252. The pins 276 ride on the cam surfaces 274 and force the stop block 44 downwardly into the recess 54 so that the front edge of the card 14 is no longer obstructed for forward movement. Turning to FIG. 15, the carriage 12 is then driven rearwardly, with the card 14 remaining in position due to the pick 266 engaged with the rear edge thereof. Once the carriage 12 is driven rearwardly, the pins 276 disengage the cam surfaces 274 of the stop block 44 which then moves back to its normal upwardly extending position. In this regard, the stop block 44 rides along the bottom surface 248 of the card 14 until it reaches the rear edge of the card 14, wherein the stop block 44 extends further upwardly to be positioned for engagement with the rear edge of the card 14. Thereafter, the carriage 12 is driven forwardly again, the forward edge of the stop block 44 engaging the rear edge of the receptor card 14 to push the card 14 forwardly until the card 14 is captured between the nip rollers 236 which then grab the card 14, heat the lower surface thereof 248 and pass it out of the apparatus 10.

It can therefore be seen that the instant invention provides a novel and effective means for transporting a receptor card 14 through successive stations in a printing and laminating apparatus. The threaded rod driven carriage 12 effectively holds the card 14 in a predetermined position, and precisely moves the card 14 beneath the printing station 22 for accurate three-pass color printing. The cleaning station 18 effectively cleans the surface 29 of the receptor card 14 prior to printing to provide a clean receptor surface 20 for printing. The cam and follower assemblies effectively lower the printing and laminating devices for engagement with the surface of the receptor card 14 during forward movement of the carriage 12 and lift the printing and laminating assemblies for movement of the carriage 12 to the starting position. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Card printing and laminating apparatus comprising:
   a printhead for printing an image on a receptor surface of a receptor card during a printing operation;
   lamination film supply apparatus for supplying a lamination film;
   a heated laminating roller mounted for engagement with said receptor surface of said receptor card during a laminating operation, said lamination film passing intermediate said heated laminating roller and said receptor surface of said receptor card during said laminating operation;
   a carriage for receiving said receptor card with said receptor surface facing upwardly;
   guide means for guiding said carriage beneath said printhead during said printing operation and beneath said heated laminating roller during said laminating operation;
   a drive motor having a rotating drive shaft;
   a transmission element coupled between said drive shaft of said drive motor and said carriage for translating rotation of said drive shaft into linear movement of said carriage along said guide means; and
   a pair of output nip rollers including a heated lower roller for engaging and heating a lower surface of said receptor card after said laminating operation
   said apparatus further comprising means for biasing said printhead to a printing position during movement of said carriage in a first direction along said guide means, means for moving said printhead to an idle position, and means for maintaining said printhead in said idle position during movement of said carriage in an opposite second direction.

2. The apparatus of claim 1 further comprising means for biasing said heated laminating roller to a laminating position during movement of said carriage in a first direction along said guide means, means for moving said heated laminating roller to an idle position, and means for maintaining said heated laminating roller in said idle position during movement of said carriage in an opposite direction.

3. The apparatus of claim 1 further comprising a cleaning roller for cleaning said receptor surface of said receptor card prior to said printing operation.

4. Card printing and laminating apparatus comprising:
   a printhead for printing an image on a receptor surface of a receptor card during a printing operation;
   lamination film supply apparatus for supplying a lamination film;
   a heated laminating roller mounted for engagement with said receptor surface of said receptor card during a laminating operation, said lamination film passing intermediate said heated laminating roller and said receptor surface of said receptor card during said laminating operation;
   a carriage for receiving said receptor card with said receptor surface facing upwardly;
   guide means for guiding said carriage beneath said printhead during said printing operation and beneath said heated laminating roller during said laminating operation;
   a drive motor having a rotating drive shaft;
   a transmission element coupled between said drive shaft of said drive motor and said carriage for translating rotation of said drive shaft into linear movement of said carriage along said guide means; and a pair of output nip rollers including a heated lower roller for engaging and heating a lower surface of said receptor card after said laminating operation, said apparatus further comprising printhead guide means for guiding vertical movement of said printhead between a lower printing position and an upper idle position, and means for normally maintaining said printhead in said idle position, said carriage including cam surfaces which engage with follower arms on said printhead during movement of said carriage, said cam surfaces moving said printhead between said upper idle position and said lower printing position during movement of said carriage along said guide means.

5. Card laminating apparatus comprising:

lamination film supply apparatus for supplying a lamination film;

a heated laminating roller mounted for engagement with said receptor surface of said receptor card during a laminating operation, said lamination film passing intermediate said heated laminating roller and said receptor surface of said receptor card during said laminating operation;

a carriage for receiving said receptor card with said receptor surface facing upwardly;

guide means for guiding said carriage beneath said heated laminating roller during said laminating operation;

a drive motor having a rotating drive shaft;

a transmission element coupled between said drive shaft of said drive motor and said carriage for translating rotation of said drive shaft into linear movement of said carriage along said guide means; and a pair of output nip rollers including a heated lower roller for engaging and heating a lower surface of said receptor card after said laminating operation, said apparatus further comprising means for biasing said heated laminating roller to a laminating position during movement of said carriage in a first direction along said guide means, means for moving said heated laminating roller to an idle position, and means for maintaining said heated laminating roller in said idle position during movement of said carriage in an opposite direction, said apparatus still further comprising a cleaning roller for cleaning said receptor surface of said receptor card.

6. Card printing and laminating apparatus comprising:

a printhead assembly for printing an image on a receptor surface of a receptor card during a printing operation;

a first receptor card transport means for transporting said receptor card into engagement with said printhead assembly;

a lamination film supply apparatus having an endless web of lamination film;

a convergence zone at which the lamination film and receptor card are brought into overlying contact;

a heated laminating roller mounted for engagement with said receptor surface of said receptor card during a laminating operation, said lamination film being positioned intermediate said heated laminating roller and said receptor surface of said receptor card during said laminating operation;

a lamination film transport means for transporting said lamination film to said convergence zone; and a second receptor card transport means for transporting said receptor card along a receptor card guide path to through said convergence zone and said heated laminating roller with said receptor surface facing upwardly.

7. The card printing and lamination apparatus of claim 6 further comprising means for heating a lower surface of said receptor card after said laminating operation, wherein the receptor card is evenly heat stressed on both upper and lower surfaces thereof.

8. The card printing and lamination apparatus of claim 7 further comprising a cleaning roller for cleaning said receptor surface of said receptor card prior to said printing operation.

9. The card printing and laminating apparatus of claim 8 wherein said printing means comprised thermal printing means.

10. The card printing and laminating apparatus of claim 7 wherein said printing means comprised thermal printing means.

11. The card printing and laminating apparatus of claim 6 further comprising a cleaning roller for cleaning said receptor surface of said receptor card prior to said printing operation.

12. The card printing and laminating apparatus of claim 11 wherein said printing means comprised thermal printing means.

13. The card printing and laminating apparatus of claim 6 wherein said printing means comprised thermal printing means.

14. Card laminating apparatus comprising:

a lamination film supply apparatus having an endless web of lamination film;

a convergence zone at which the lamination film and receptor card are brought into overlying contact;

a heated laminating roller mounted for engagement with said receptor surface of said receptor card during a laminating operation, said lamination film being positioned intermediate said heated laminating roller and said receptor surface of said receptor card during said laminating operation; and a lamination film transport means for transporting said lamination film to said convergence zone; and a receptor card transport means for transporting said receptor card along a receptor card guide path to through said convergence zone and said heated laminating roller with said receptor surface facing upwardly.

15. The card laminating apparatus of claim 14 further comprising means for heating a lower surface of said receptor card after said laminating operation, wherein the receptor card is evenly heat stressed on both upper and lower surfaces thereof.

16. The card laminating apparatus of claim 14 further comprising a cleaning roller for cleaning said receptor surface of said receptor card prior to said printing operation.

17. The card laminating apparatus of claim 15 further comprising a cleaning roller for cleaning said receptor surface of said receptor card prior to said printing operation.

* * * * *